(12) United States Patent
Law et al.

(10) Patent No.: US 11,969,839 B2
(45) Date of Patent: Apr. 30, 2024

(54) MOBILE FASTENER MACHINE PLATFORM

(71) Applicant: Swinerton Incorporated, San Francisco, CA (US)

(72) Inventors: Eric Law, San Francisco, CA (US); Tristen Magallanes, San Francisco, CA (US); Alex Wuebben, San Francisco, CA (US)

(73) Assignee: Swinerton Incorporated, San Francisco, CA (US)

( * ) Notice: Subject to any disclaimer, the term of this patent is extended or adjusted under 35 U.S.C. 154(b) by 270 days.

(21) Appl. No.: 17/407,710

(22) Filed: Aug. 20, 2021

(65) Prior Publication Data

US 2022/0055162 A1    Feb. 24, 2022

Related U.S. Application Data

(60) Provisional application No. 63/068,196, filed on Aug. 20, 2020.

(51) Int. Cl.
| | |
|---|---|
| *B23P 19/00* | (2006.01) |
| *B23P 19/06* | (2006.01) |
| *B25B 21/00* | (2006.01) |
| *B25H 5/00* | (2006.01) |
| *B62B 3/12* | (2006.01) |

(52) U.S. Cl.
CPC ............. *B23P 19/06* (2013.01); *B23P 19/002* (2013.01); *B25B 21/007* (2013.01); *B25H 5/00* (2013.01); *B62B 3/12* (2013.01)

(58) Field of Classification Search
CPC .......... B23P 19/06; B23P 19/00; B23P 19/10; B23Q 3/00; B23Q 3/06; B25B 11/00; B25B 11/007
See application file for complete search history.

(56) References Cited

U.S. PATENT DOCUMENTS

| | | | |
|---|---|---|---|
| 4,246,939 A | 1/1981 | Boegel | |
| 5,058,464 A * | 10/1991 | McGovern | ............ B25B 21/002 81/433 |
| 5,904,079 A | 5/1999 | Tsuge et al. | |
| 5,960,678 A * | 10/1999 | Kennedy | ................. B25B 23/04 81/57.37 |
| 5,975,350 A | 11/1999 | Han | |

(Continued)

FOREIGN PATENT DOCUMENTS

| | | |
|---|---|---|
| DE | 3614007 A1 | 11/1987 |
| DE | 102011013878 A1 | 9/2012 |

(Continued)

*Primary Examiner* — Lee D Wilson
(74) *Attorney, Agent, or Firm* — Akerman LLP; Peter A. Chiabotti

(57) ABSTRACT

An apparatus for providing an efficient platform for installing screws can include a cart with wheels and a screw assembly mounted to the cart. The screw assembly can include a screwing device that rotates a drive shaft that engages a screw, a screw guide tube and a screw feeding tube connected to the screw guide tube. In another embodiment, an assembly is provided. The assembly may include a bracket for coupling to a moveable platform, a screwing device coupled to the bracket and that rotates a drive shaft that engages a screw, a screw guide tube and a screw feed tube connected to the screw guide tube.

16 Claims, 15 Drawing Sheets

(56) References Cited

U.S. PATENT DOCUMENTS

| | | | |
|---|---|---|---|
| 6,138,535 A | 10/2000 | Jalbert et al. | |
| 6,170,366 B1 | 1/2001 | Jalbert et al. | |
| 6,186,035 B1 | 2/2001 | Jalbert et al. | |
| 6,230,594 B1 | 5/2001 | Jalbert et al. | |
| 6,412,603 B1 | 7/2002 | Nervig et al. | |
| 6,866,443 B2 | 3/2005 | Nanaumi et al. | |
| 6,929,250 B2 | 8/2005 | Blake et al. | |
| 6,945,140 B2 | 9/2005 | Gibbons et al. | |
| 7,059,616 B2 | 6/2006 | Wu | |
| 7,134,367 B2 | 11/2006 | Gehring et al. | |
| 7,367,571 B1 * | 5/2008 | Nichols | B62B 1/12 280/47.131 |
| 7,415,910 B2 | 8/2008 | Arai | |
| 7,493,839 B2 | 2/2009 | Massari, Jr. et al. | |
| 7,857,328 B1 | 12/2010 | Boss | |
| 7,896,083 B2 | 3/2011 | Vickery | |
| 7,962,996 B1 | 6/2011 | Mondello | |
| 8,016,300 B2 | 9/2011 | Cramer et al. | |
| 8,074,348 B2 | 12/2011 | Haytayan | |
| 8,282,111 B2 | 10/2012 | Hailston et al. | |
| 8,726,848 B2 | 5/2014 | Melhorn et al. | |
| 8,894,076 B2 | 11/2014 | Hailston et al. | |
| 8,931,787 B2 | 1/2015 | Crawford et al. | |
| 9,278,040 B2 | 3/2016 | Hung | |
| 9,283,975 B2 | 3/2016 | McClanahan et al. | |
| 9,352,435 B2 | 5/2016 | Spishak et al. | |
| 9,573,639 B1 | 2/2017 | Furtado | |
| 9,630,640 B1 | 4/2017 | Collins et al. | |
| 9,682,465 B2 | 6/2017 | Lan et al. | |
| 9,751,549 B2 | 9/2017 | McClanahan et al. | |
| 9,758,184 B1 | 9/2017 | Vaverek | |
| 9,802,300 B2 | 10/2017 | Vandenberg | |
| 10,040,674 B2 | 8/2018 | Xu et al. | |
| 10,118,632 B2 | 11/2018 | Carzola | |
| 10,315,295 B2 | 6/2019 | Vandenberg | |
| 10,543,983 B2 | 1/2020 | Otto et al. | |
| 10,569,397 B2 | 2/2020 | Arai et al. | |
| 2003/0047895 A1 | 3/2003 | McElroy | |
| 2004/0139822 A1 | 7/2004 | Gehring et al. | |
| 2005/0039580 A1 | 2/2005 | Gibbons et al. | |
| 2006/0038383 A1 | 2/2006 | Wu | |
| 2006/0053978 A1 | 3/2006 | Arai | |
| 2006/0169415 A1 | 8/2006 | Lawson et al. | |
| 2006/0191385 A1 | 8/2006 | Massari et al. | |
| 2006/0220334 A1 | 10/2006 | Liao | |
| 2007/0187915 A1 | 8/2007 | Filiatrault | |
| 2007/0199277 A1 | 8/2007 | Martin | |
| 2007/0271761 A1 | 11/2007 | Haytayan | |
| 2008/0224431 A1 * | 9/2008 | Reinicke | B62B 1/262 280/47.26 |
| 2010/0181737 A1 * | 7/2010 | Reinicke | B62B 1/262 280/47.19 |
| 2012/0210831 A1 | 8/2012 | Liang | |
| 2012/0319063 A1 | 12/2012 | Hailston et al. | |
| 2014/0007742 A1 | 1/2014 | Tochibori | |
| 2014/0117638 A1 | 5/2014 | Crawford et al. | |
| 2014/0218282 A1 | 8/2014 | Hung | |
| 2015/0050107 A1 | 2/2015 | Kipp | |
| 2015/0166314 A1 | 6/2015 | Xu et al. | |
| 2015/0210306 A1 * | 7/2015 | Oachs | B62B 3/00 280/79.11 |
| 2015/0321325 A1 | 11/2015 | Vandenberg | |
| 2016/0136663 A1 | 5/2016 | Smith | |
| 2017/0101119 A1 | 4/2017 | Collins et al. | |
| 2017/0312896 A1 | 11/2017 | Arai et al. | |
| 2017/0334644 A1 | 11/2017 | Otto | |
| 2017/0341666 A1 | 11/2017 | Carzola | |
| 2018/0117754 A1 | 5/2018 | Corn | |
| 2018/0243889 A1 | 8/2018 | Myers et al. | |
| 2019/0023298 A1 | 1/2019 | Carzola | |
| 2022/0055162 A1 * | 2/2022 | Law | B23P 19/002 |

FOREIGN PATENT DOCUMENTS

| | | |
|---|---|---|
| DE | 102011013878 B4 | 7/2014 |
| IT | 1203488 B | 2/1989 |
| WO | 2002057434 A2 | 7/2002 |

\* cited by examiner

MOBILE FASTENER MACHINE PLATFORM

CROSS REFERENCE TO RELATED APPLICATION

This non-provisional patent application claims priority to, and incorporates herein by reference, U.S. Provisional Patent Application No. 63/068,196 that was filed Aug. 20, 2020.

FIELD OF THE INVENTION

The present application relates to fastener machines, and more particularly, to mobile screw machines.

BACKGROUND

Construction requires a variety of tools and fasteners to create stable structures. Traditional and general tools have been used for a variety of tasks. Although such tools, such a hammer and nail, are sufficient, room for significant improvement exists. Specialized tools can greatly increase the efficiency and productivity of certain jobs.

SUMMARY

A mobile platform and related devices, apparatuses and assemblies are disclosed for rapidly screwing fasteners, such as screws, into wood and other materials. The mobile platform can include a cart with wheels, a fastener driver device and fastener feeding structure that allows the user to quickly and efficiently insert the fasteners into the desired location. The cart can include an upright structure configured to be the height of an average user.

In operation, the user can walk behind the cart in a comfortable upright position without the need to bend down or get on the user's knees. In the upright position, the user can obtain a fastener from a bin of the upright structure and insert the fastener, such as a screw, into the fastener feeding structure. The fastener will be guided to be aligned with the fastener driver device that ultimately drives the fastener into the desired location, such as a wood deck. The user can then simply roll the mobile platform to the next desired location and repeat the process.

The mobile platform provides for labor productivity gains while greatly reducing the chance of injury, particular when fastening wood or mass timber decks. The operator of such a platform can operate the devices herein while standing upright. Without the need to constantly bend down or sit down, productivity increases can range from 75% to 90%. By operating the devices herein in a standing position, the risk of injury is decreased. Still further, the mobile platform provides for uniform construction resulting in stronger builds and that a ensured to be compliant with established standards. Further, the flexibility of the system between the lateral distance of screw insertion points and the distance from one insertion to the next allows the platform to meet standards as they evolve.

In one embodiment, an apparatus can include a cart with wheels and a screw assembly mounted to the cart. The screw assembly can include a screwing device that rotates a drive shaft that engages a screw, a screw guide tube and a screw feeding tube connected to the screw feeding tube. The tip of the drive shaft can be dimensioned to engage the head of a screw.

The screw guide tube can include a port for viewing the drive shaft and/or a plurality of screw centering bristles to align the screw with the drive shaft.

In another embodiment, an assembly is provided. The assembly can include a bracket for coupling to a moveable platform, a screwing device coupled to the bracket and that rotates a drill shaft that engages a screw, a screw guide tube and a screw feed tube connected to the screw guide tube.

The assembly can also include a rail to which the bracket slidably mounts. The rail can include spaced stops to maintain the screwing device at a particular height.

According to yet another embodiment, a biased return device can be provided that provides a force to return the screwing device to a rest position.

Further, sensors or limit stops can be provided to provide for automated turning off and turning on of the screwing devices. Also, a distance sensor can be provided to provide the user with a visual or auditory indication of appropriate screw placement.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Embodiments of the present disclosure are best understood by referring to FIGS. 1-15 of the drawings, like numerals being used for like and corresponding parts of the various drawings.

FIGS. 1-12 illustrate a mobile platform 100 for inserting fasteners, such as screws, in a desired location. As an example, the mobile platform 100 can be used by a single operator to insert large screws in a wood deck, such as a mass timber deck made of laminated or otherwise processed wood. The platform 100 can be operated at the operator's normal standing height without the need to bend over or get on the operator's knees. As shown, the mobile platform 100 can simultaneously insert two fasteners.

Figure 1:
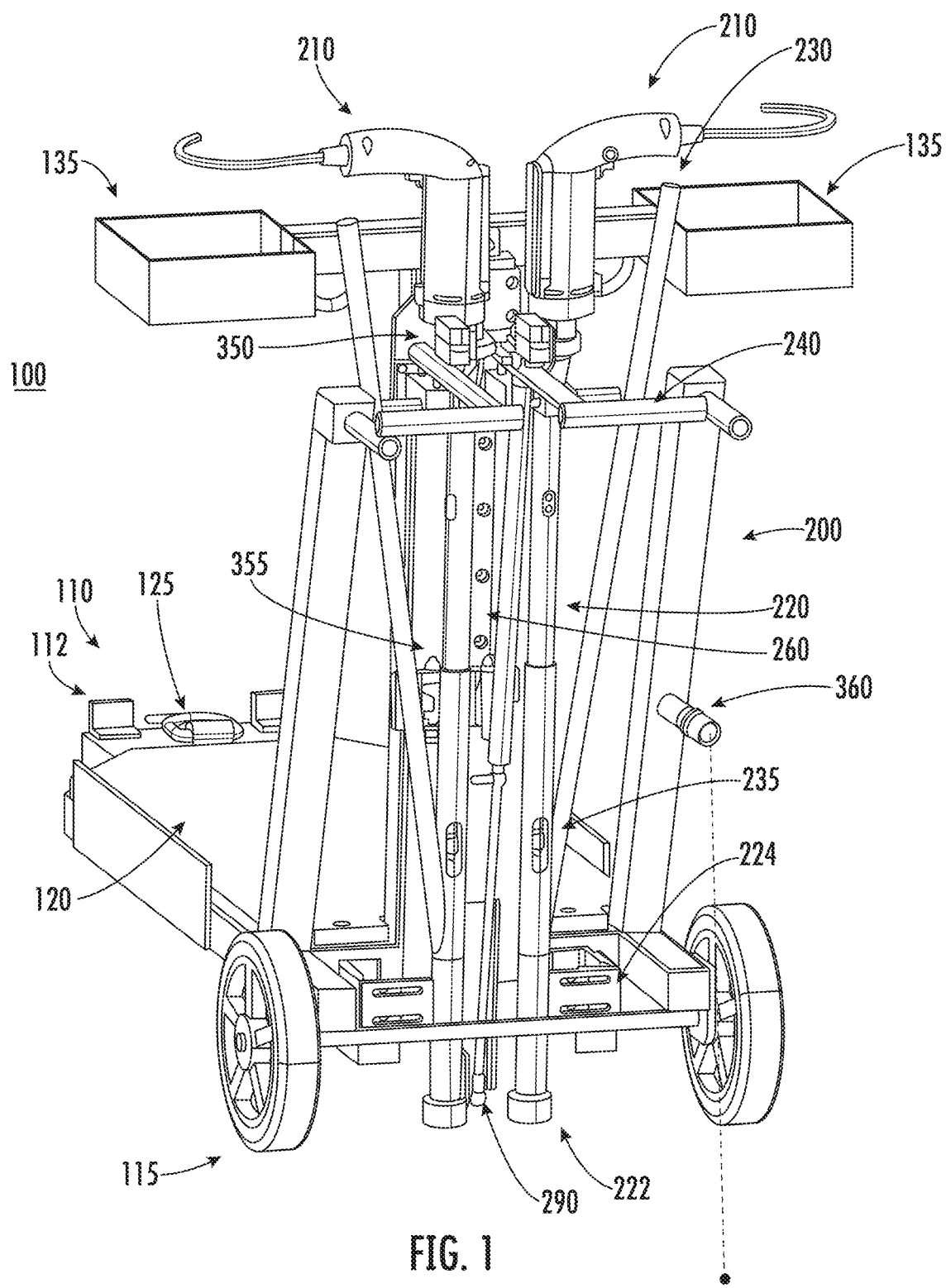
FIG. 1 is a perspective view of a screw machine according to an embodiment of the present disclosure.

As shown in FIG. 1, the mobile platform 100 can have a cart 110 with a screw assembly 200 mounted, that can be mounted to, fixed to, or an extension of the cart 110. The screw assembly 200 can include screwing devices 210, screw guide tubes 220, screw feeding tubes 230, drive handles 240, rail 260, rail cars 270, bracket 280, biased return device 290 and other related components shown in detail FIGS. 9-12.

Figure 3:
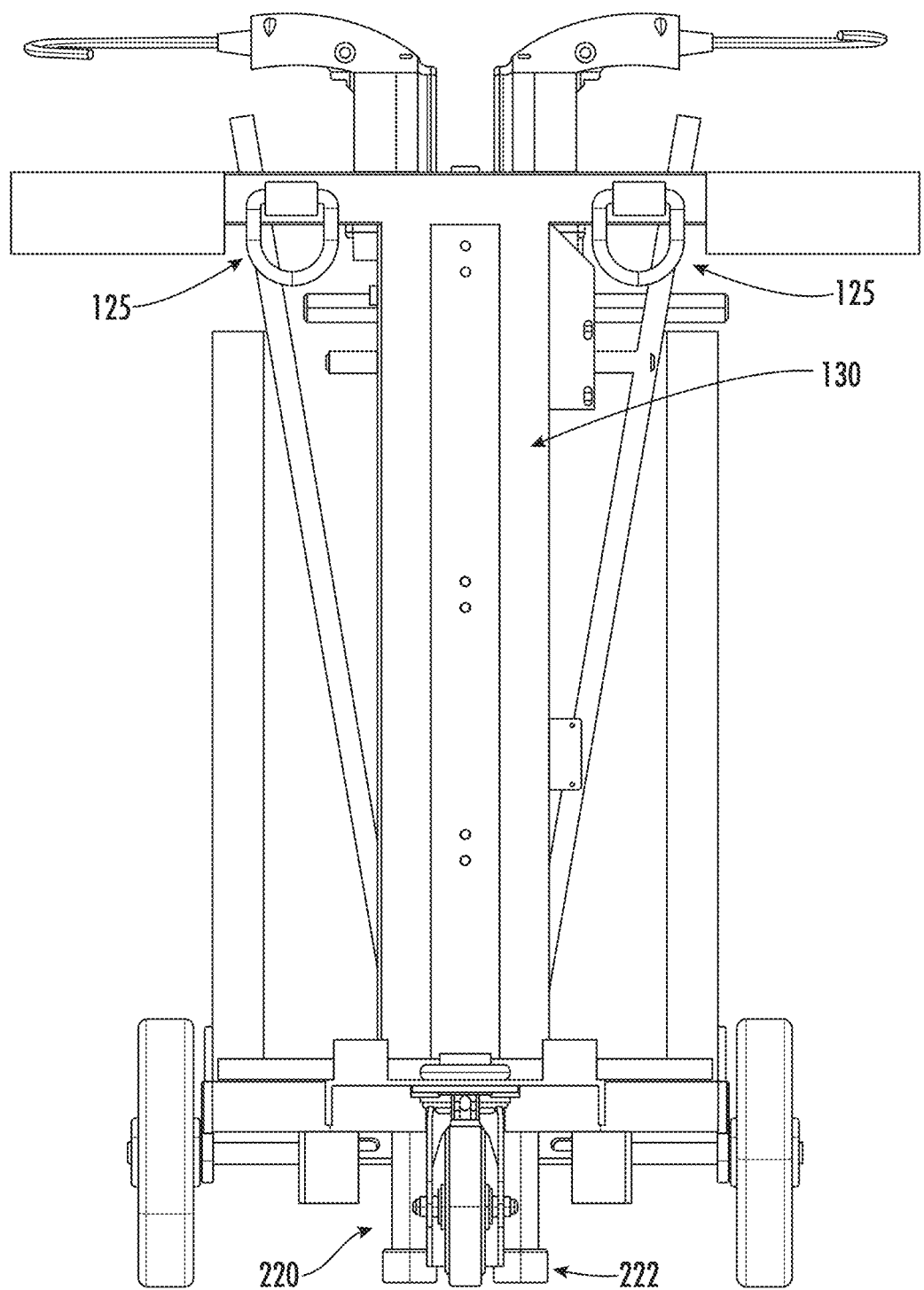
FIG. 3 is a front view of the screw machine of FIG. 1.
Figure 4:
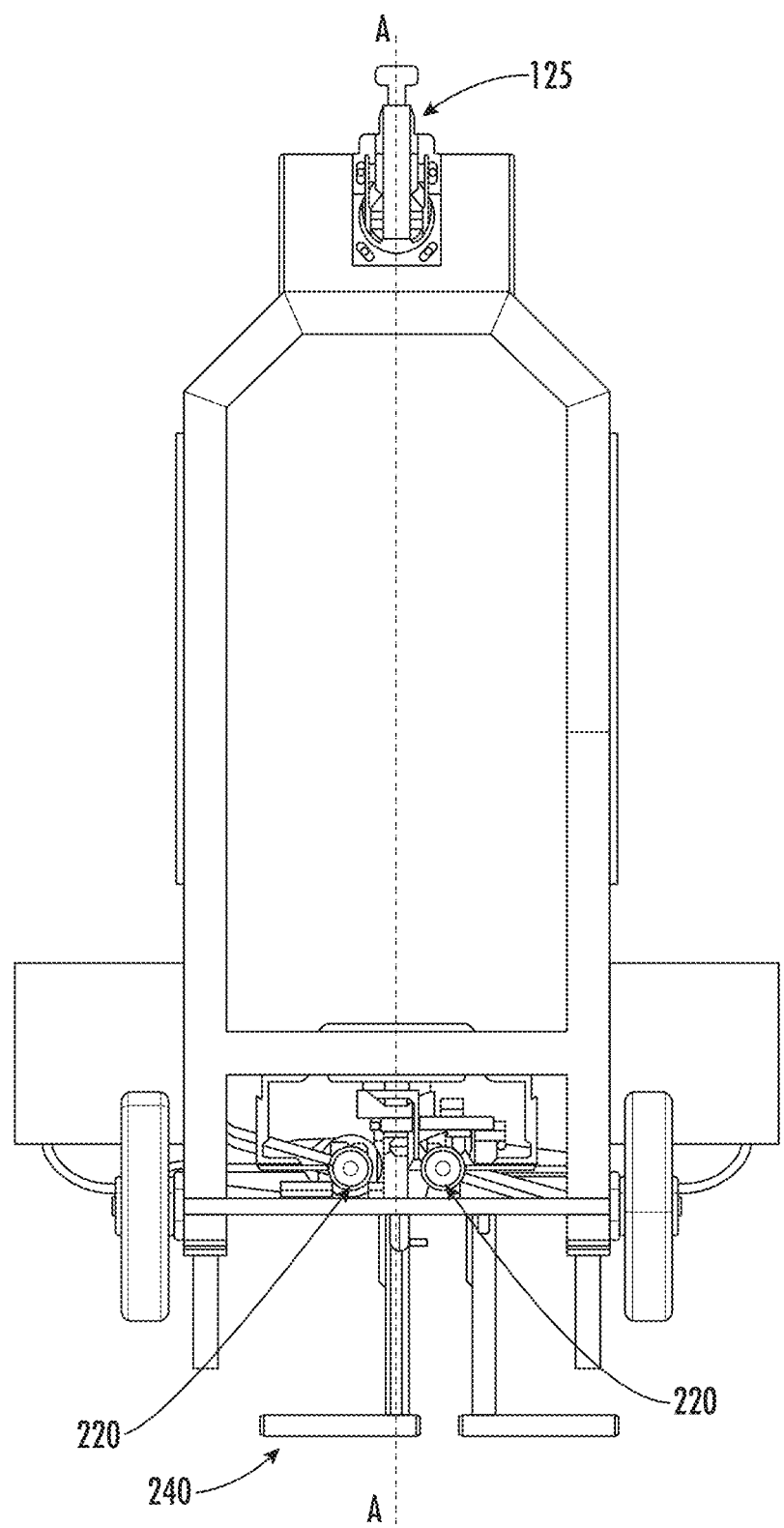
FIG. 4 is a bottom view of the screw machine of FIG. 1.
Figure 5:
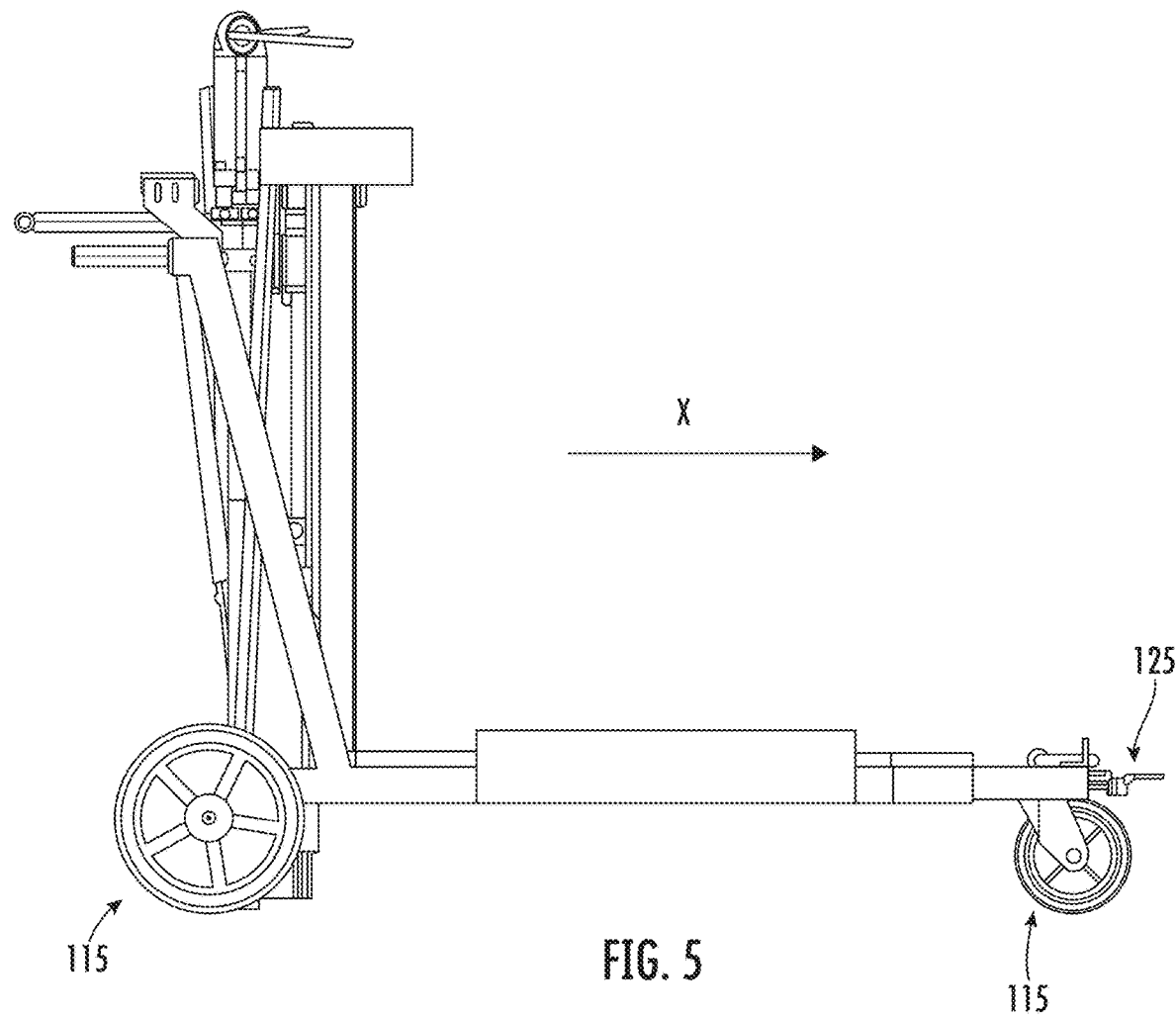
FIG. 5 is a side view of the screw machine of FIG. 1.
Figure 6:
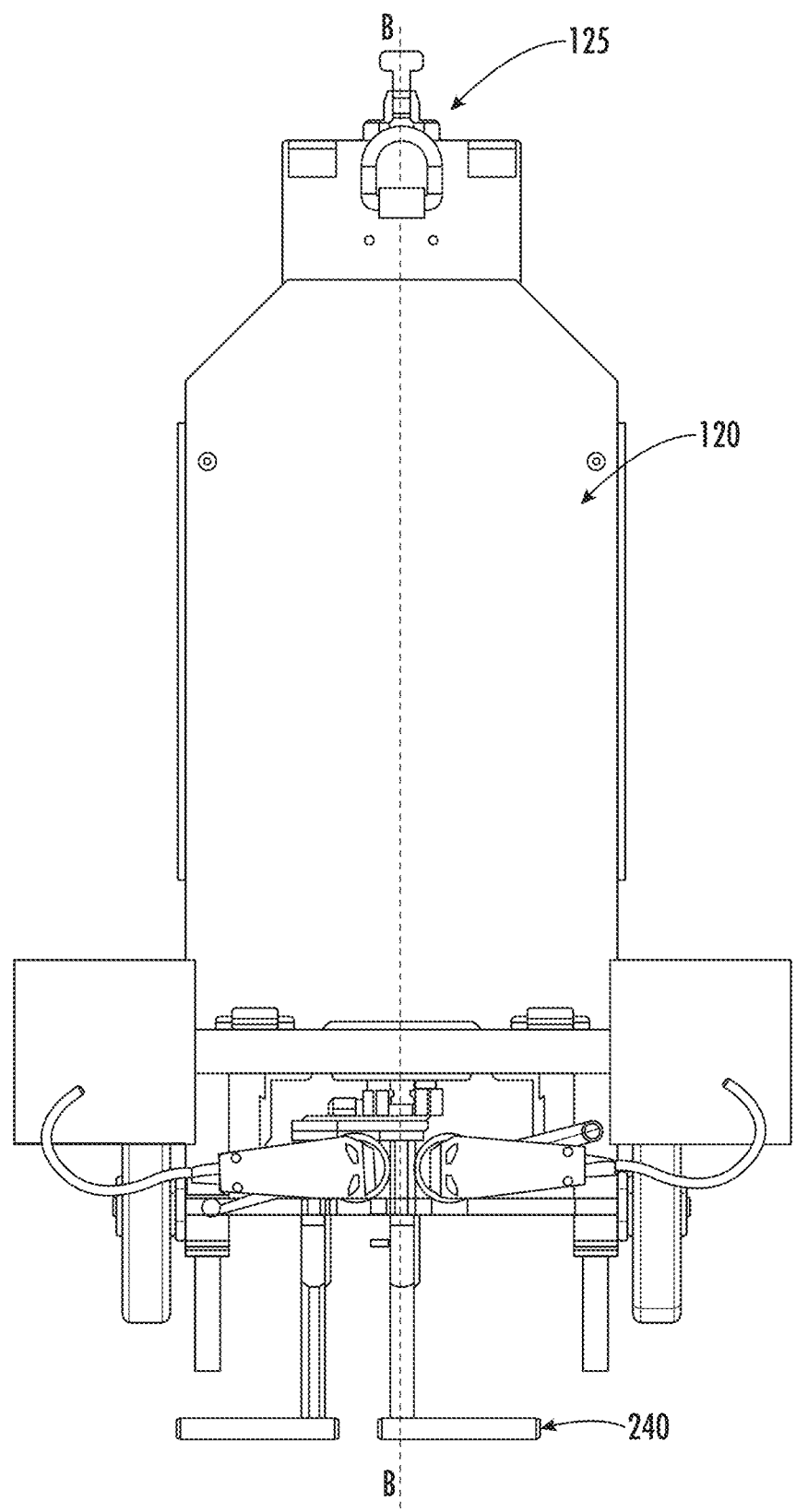
FIG. 6 is a top view of the screw machine of FIG. 1.
Figure 7:
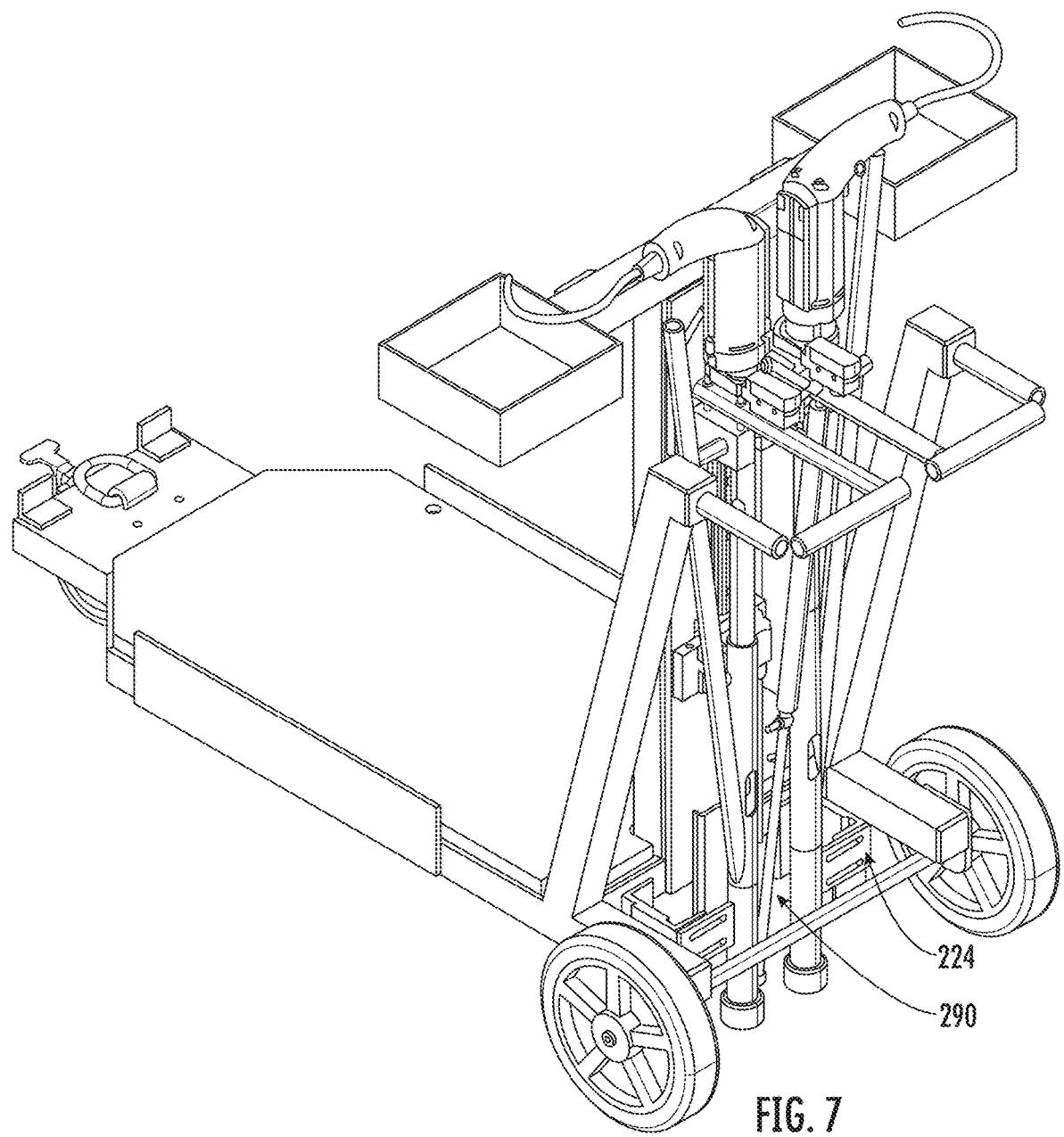
FIG. 7 is another perspective view of the screw machine of FIG. 1.
Figure 8:
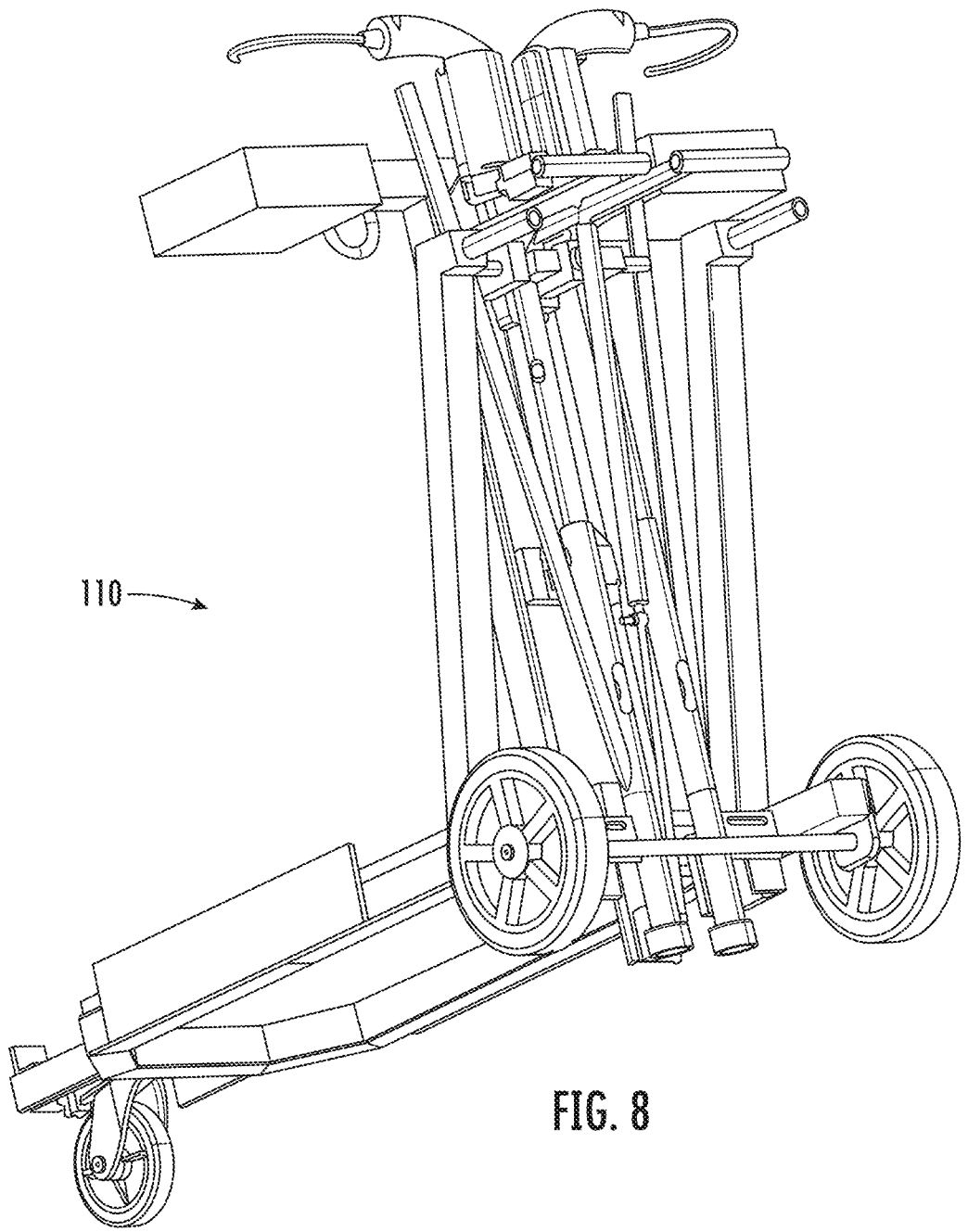
FIG. 8 is another perspective view of the screw machine of FIG. 1.
Figure 9:
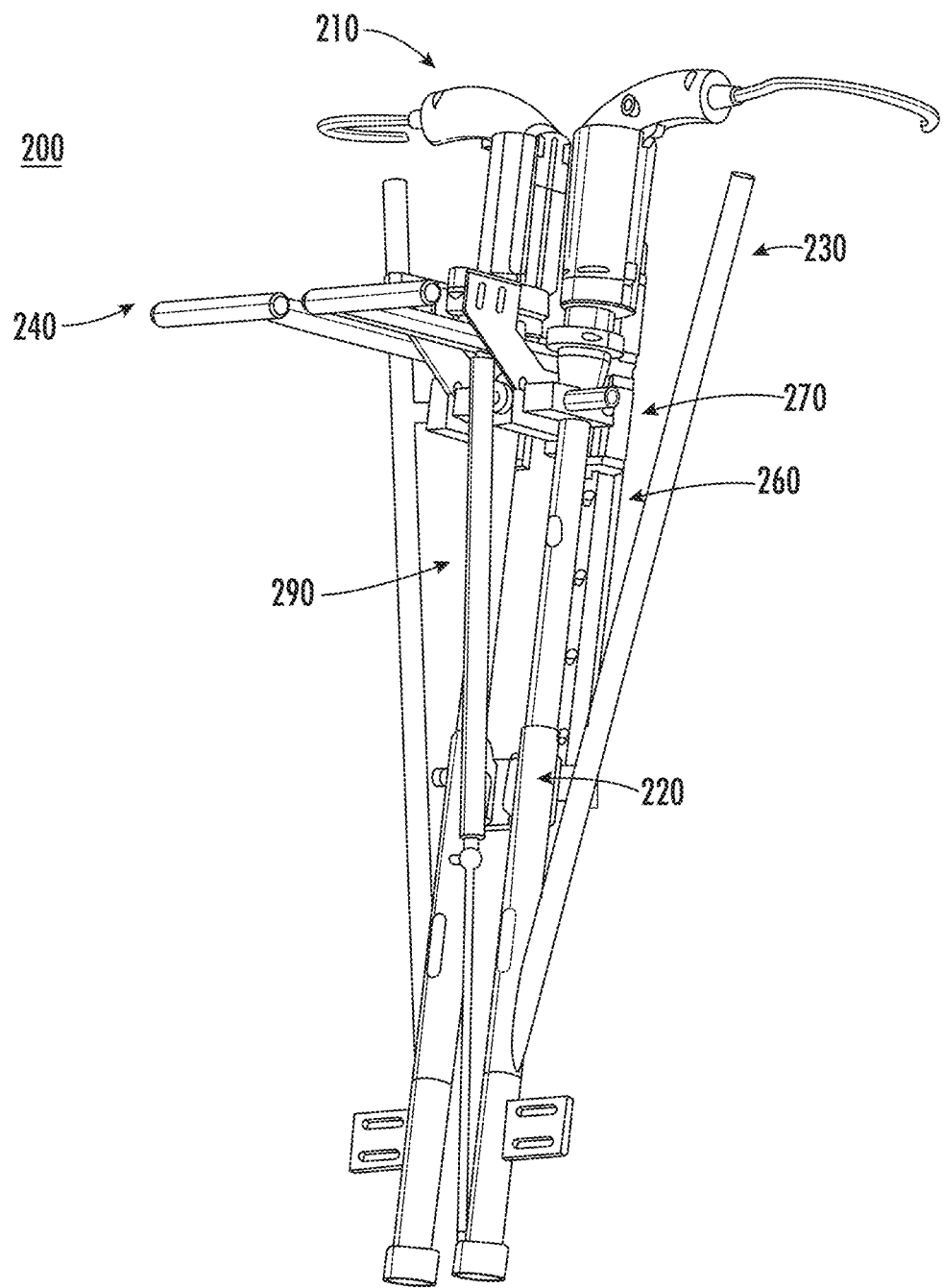
FIG. 9 is a perspective view of an assembly for a screw machine.
Figure 10:
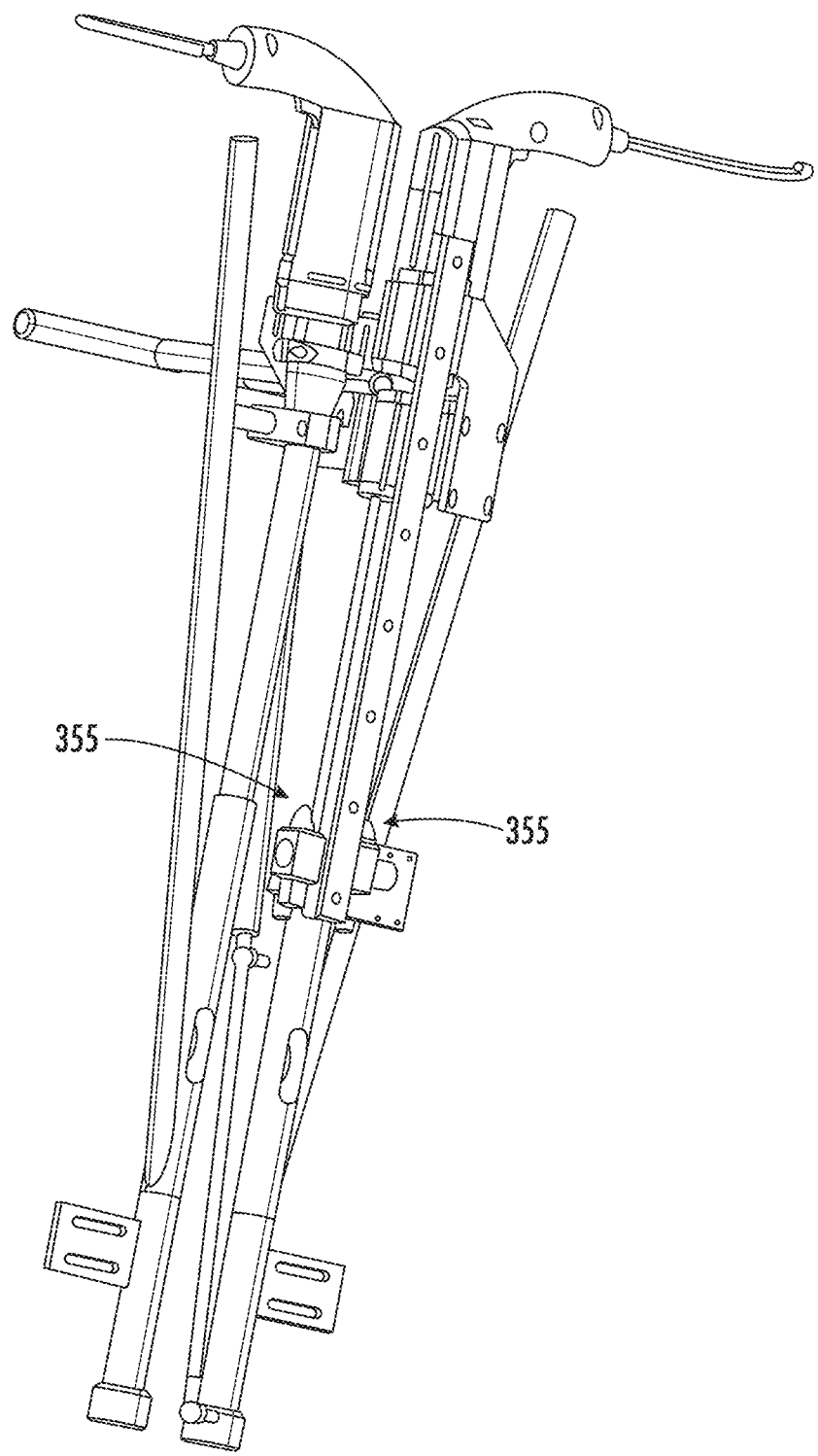
FIG. 10 is an alternative perspective view of the assembly of a screw machine of FIG. 9.

The cart 110 can have wheels 115 that allow the cart be rolled along any suitable surface. The cart 110 can have a deck 120 used to store materials to be used with the platform 100 or other materials and supplied to be used during construction. For instance, the deck 120 may be used to store boxes of fasteners, such screws. The deck also can provide a counterbalance weight to ensure stability of the platform in operation. The cart 110 can also have hooks 125 for attachment to other machines, such as cranes. As shown in FIGS. 1 and 3, hooks 125 may be located on or near the desk or upper portions of the cart 110.

As further shown in FIG. 3, the cart 110 can also have an upright structure 130 configured to be the height of an average operator. The upright structure 130 can have bins 135 that can store fasteners, such as screws, that are readily accessible and adjacent to their point of insertion in screw feeding tube 230. The bins 135 can be dimensioned to hold the screws used with the platform 100. Referring back to FIG. 1, the upright structure can support the rail 260 with grooves on opposing lateral sides.

The cart 110 can have alignment tabs 112. The alignment tabs 112 provide a visual guide of ensuring proper placement of the cart 110, and thus the fasteners placed with the platform 100.

Figure 2:
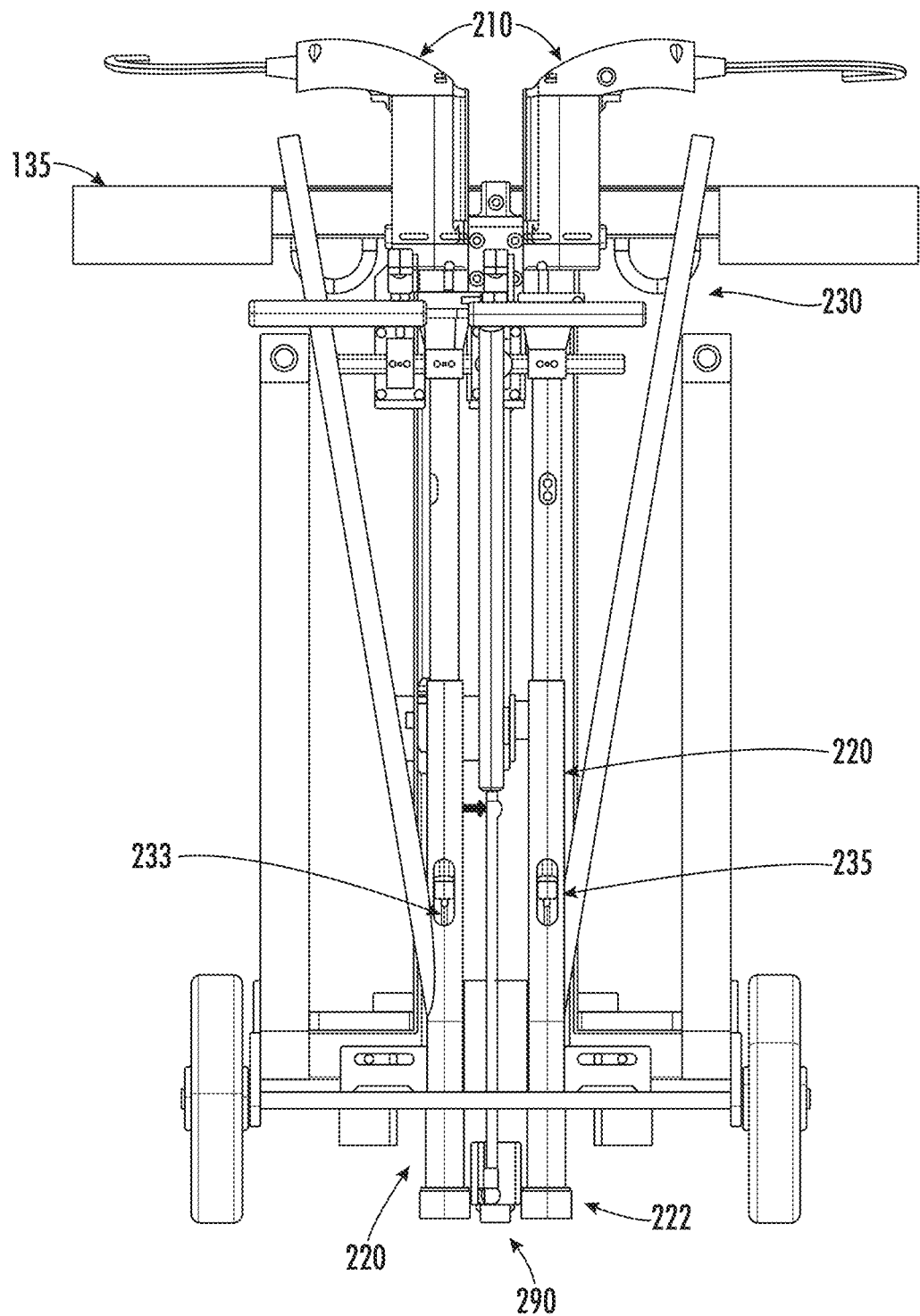
FIG. 2 is a rear view of the screw machine of FIG. 1.

As shown in FIG. 2, the screwing devices 210 can be electric, gas, pneumatic drills for screwing or otherwise inserting a fastener, such as a screw, in the desired position. The screw devices 210 operated by rotating a drive shaft 233 that engages a screw or other fastener to drive the screw into the desired location. The tip of the drive shaft 233 can be dimensioned to engage the head of a screw. The screwing devices 210 can be operated simultaneously or either of the screwing devices 210 can be operated without the other also being operated. Regardless of whether operated simultaneously, offset or in a solo manner, the screwing devices operate independently of each other. As an example, one screwing device 210 can rotate its drive shaft 233 faster than the other screwing device 210 rotates its drive shaft 233. Thus, even when operated simultaneously or in a joint fashion, the speed and pressure provided by the screwing devices 210 can operated and applied independently to accommodate differences of the fastener insertion points.

In some embodiments, the screwing devices 210 can be independently coupled to a respective rail cars 270 to allow for independent movement of the screwing devices 210. With such independent movement, screwing devices 210 can drive a fastener at an independent rate and descend or ascend independent of the other screwing device 210.

The screw guide tubes 220 can be respective cylindrical tubes concentric with the drive shaft 233 of the respective screwing devices 210. The guide tubes 220 can hold the screw in place because the guide tubes 220 can be dimensioned with an internal diameter that is only slightly larger than the outer diameter of head of a screw or other fastener. The proximal ends of the guide tubes 220 that are adjacent to the work surface provides a visual indication of the screw insertion point.

Additionally, each screw guide tube 220 can be coupled to support a support brace 224, which is coupled to the frame of cart 110. The support braces 224 can have laterally extending slots through which a bolt or other fastener can be placed to secure the support brace 224 and screw guide tube 220 relative to the frame of cart 110.

The screw guide tubes 220 can include collars 222 at the proximal end of the screw guide tubes 220. The collars 222 can be press fit on the proximal ends of guide tubes 220. In one arrangement, collars 222 can be press-fit on the screw guide tubes 220. The internal diameter of the collars 222 can be slightly larger than the exterior diameter of the screw guide tubes 220. Further, the collars 222 can have an internal annular seat or groove with an internal diameter that is larger than the internal diameter of the collars 222.

The screw guide tubes 220 can include ports 235. The ports 235 provide a cutout for visual inspection of the interior of the respective guide tubes 220 and the drive shafts 233 of the screwing devices 210. The ports 235 can also be used to visually inspect, access and change the drive shafts 233 of screwing devices 210. The ports 235 can also be used to clear any cuttings, dust or other debris that may accumulate in the respective guide tubes 220 during operation.

Figure 11:
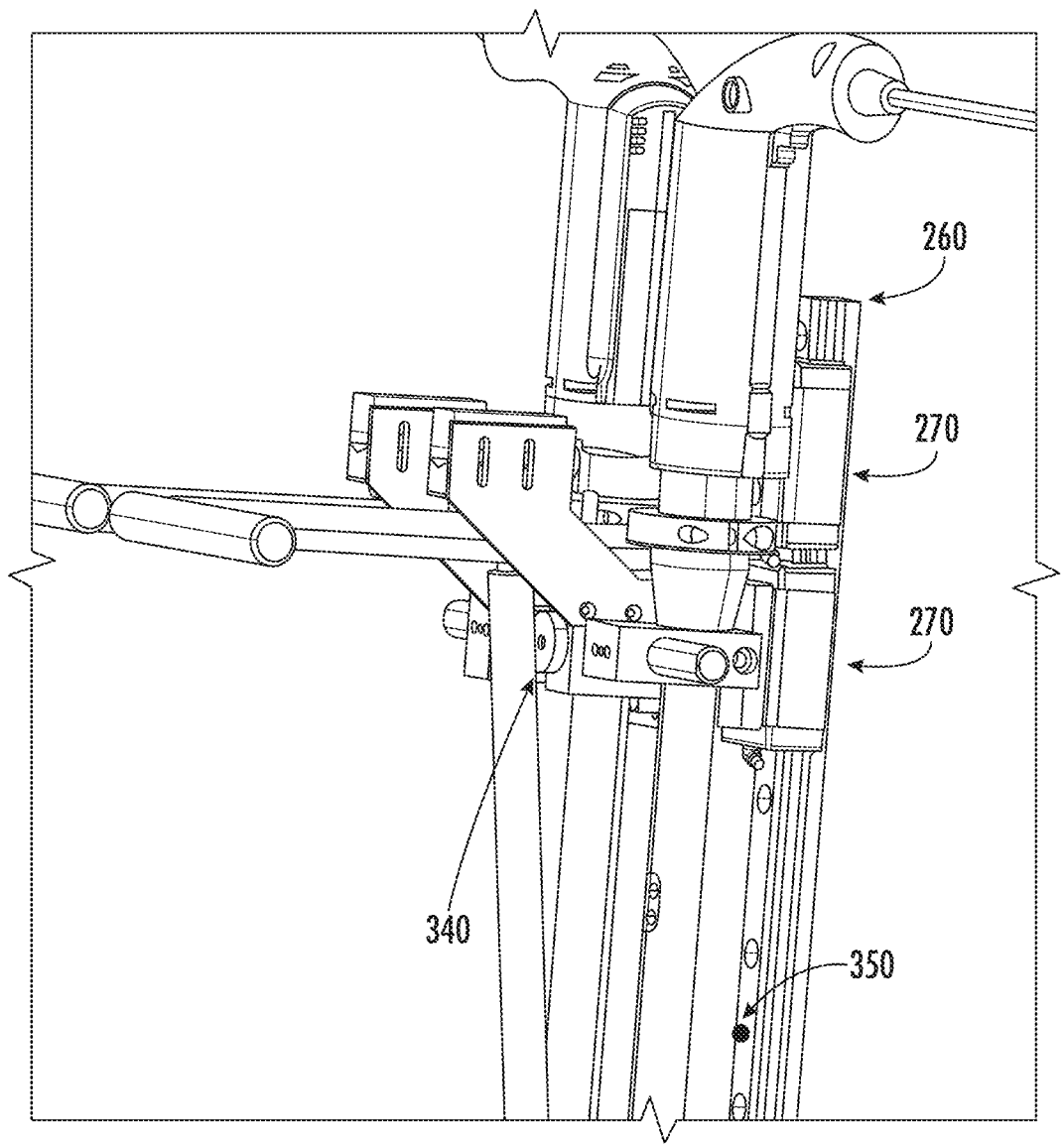
FIG. 11 is a partial view of the assembly of a screw machine of FIG. 9.
Figure 12:
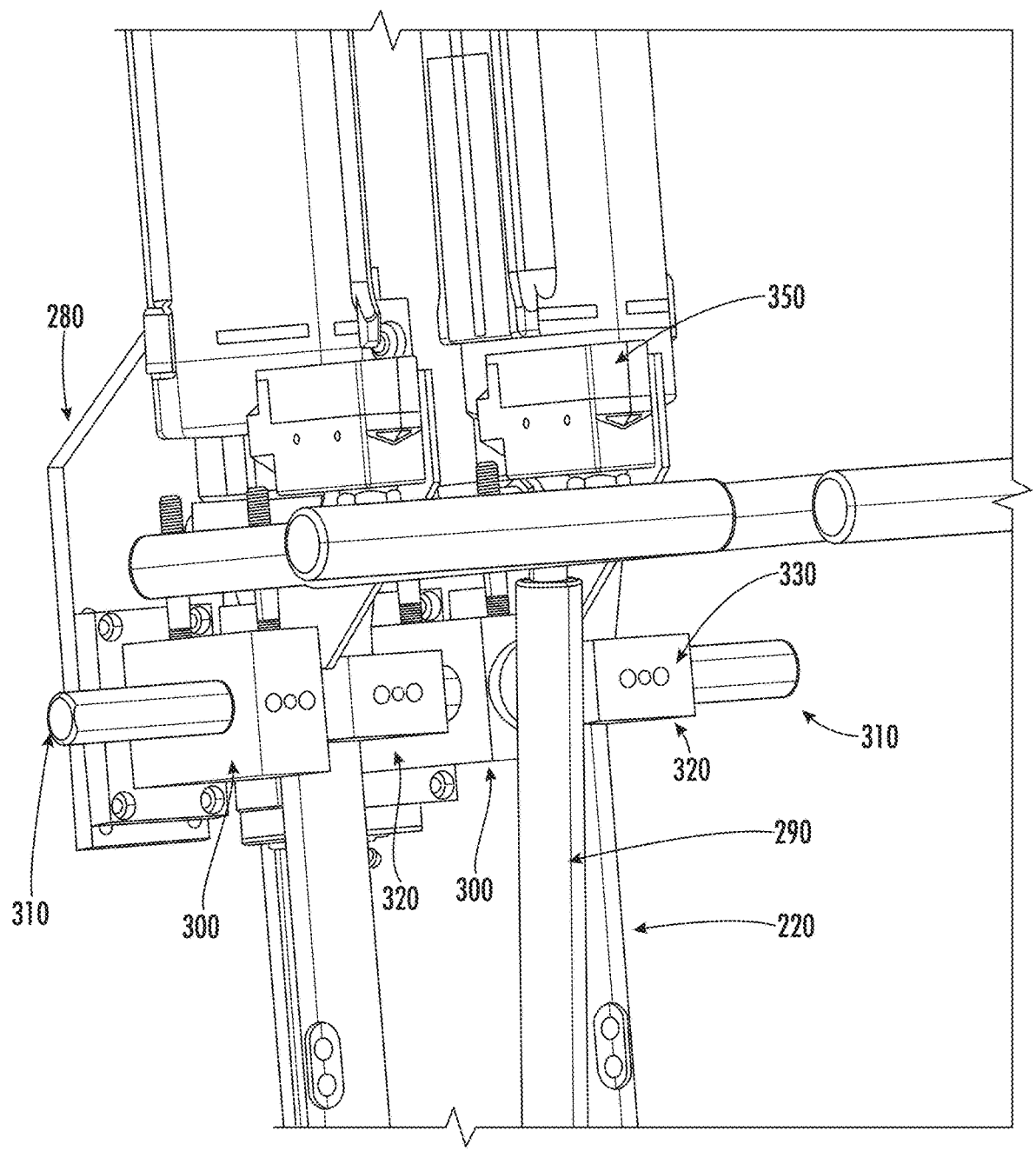
FIG. 12 is another partial view of the assembly of a screw machine of FIG. 9.
Figure 13:
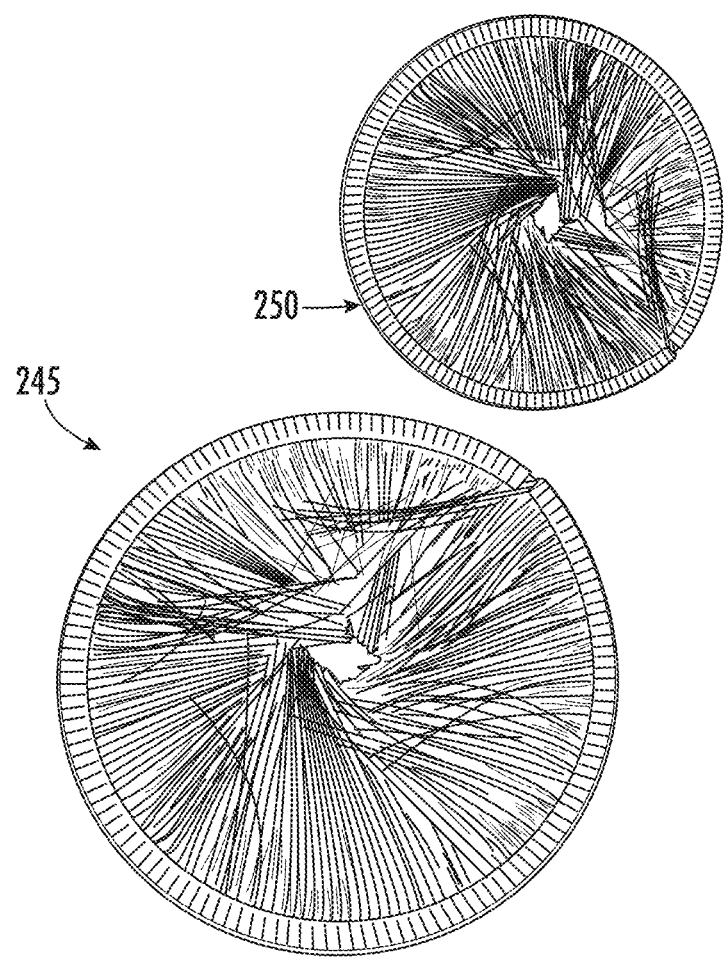
FIG. 13 is a component of a screw machine.
Figure 14:
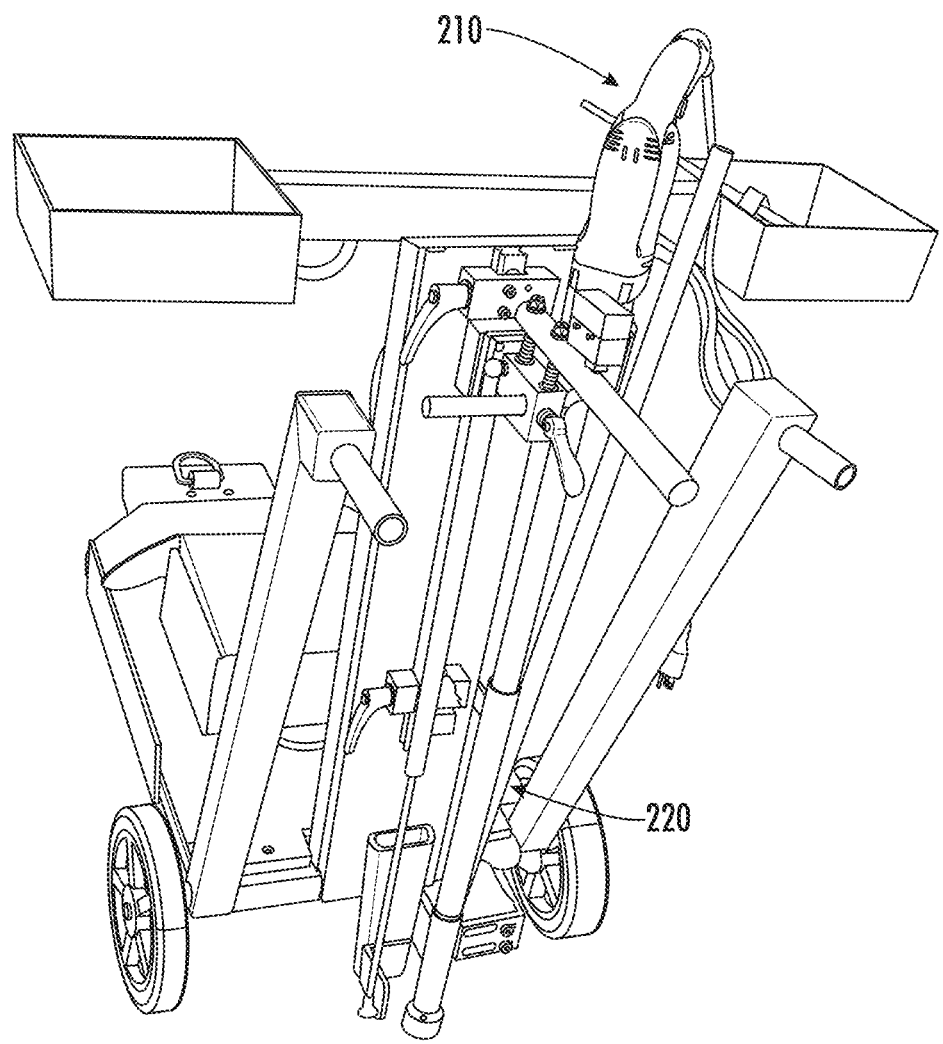
FIG. 14 is a perspective view of a screw machine according to another embodiment of the present disclosure.
Figure 15:
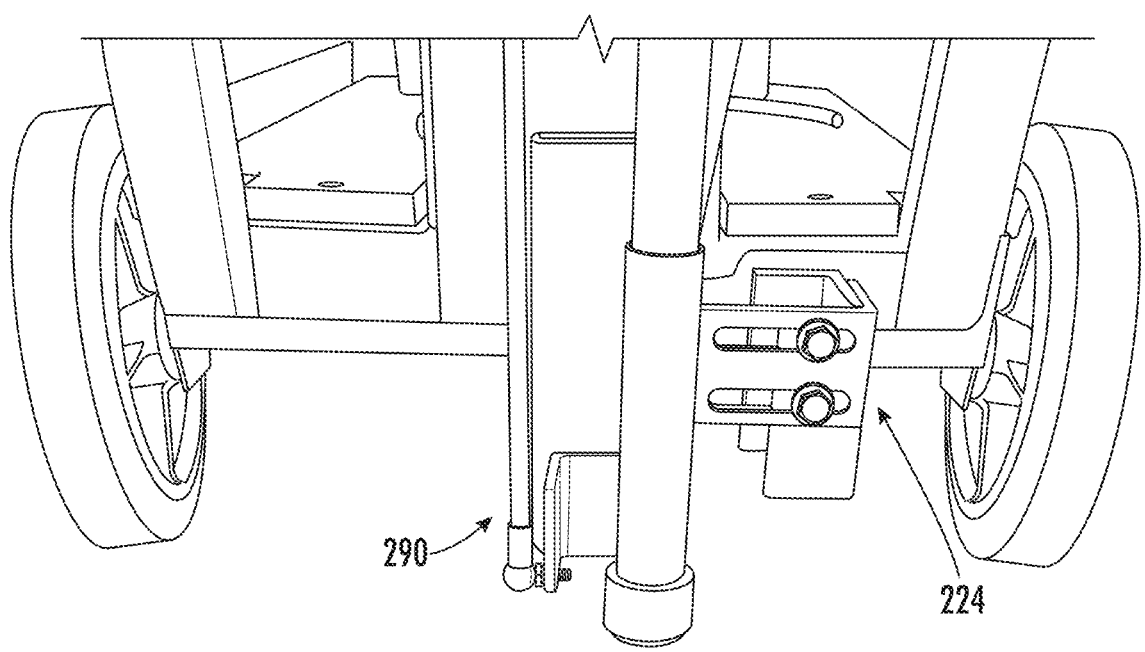
FIG. 15 is a close up of a portion of the screw machine of FIG. 14.

As shown in FIG. 11, the screw guide tubes 220 can include a plurality of bristles 245 for centering and holding the insertion point of a screw in a proper position prior to engagement by a drill shaft 233 of a screwing device 210. Each bristle of the plurality of bristles 245 can project inward towards the center of a respective screw guide tube 220. The plurality of bristles 245 can be embedded in an incomplete annular disk 250 that has a diameter the substantially same as an inner diameter of the respective screw guide tube 220. The annular disk 250 with plurality of bristles 245 can be inserted into the respective screw guide tube 220 and seat in an annular groove of the collars 222. Additionally, if the plurality of bristles 245 wear over time or use, the annular disk 250 with plurality of bristles 245 can be replaced.

The screw feeding tube 230 are connected to a respective screw guide tube 220. The screw feeding tubes 230 can be cylindrical and dimensioned to be larger than the largest diameter of a fastener, such as a screw. With such dimensions, a screw can be dropped down a respective screw feeding tube 230 and gravity will carry the screw to its intended location. A respective screw feeding tube 230 can join a respective screw guide tube 220 such that the interior of a screw feeding tube 230 allows a screw to easily and without obstruction pass to the interior of a respective screw guide tube 220. In one example, the screw feeding tubes 230 can have the same diameter as the diameter of the respective screw guide tubes 220. To accommodate different size screws with a single platform 100, the screw feeding tube 230 can have the same diameter as the diameter of the screw guide tube 220, and the other screw feeding tube 230 and the other screw guide tube 220 where the diameter of the screw feeding tubes 230 are different.

The drive handles 240, rail 260, rail cars 270 and bracket 280 are coupled to provide for movement of the screwing devices down to insert a screw and back up to a rest or non-engaged position where a fastener or screw can be inserted into the screw guide tubes. The rail cars 270 are slidably coupled to the rail 260 to allow for up and down movement of the assembly. The bracket 280 is coupled to one the rail cars 270 and is offset to a side of the rail 260. Each rail car 270 is coupled to a slidable rail car base 300 that is slidably mounted to a spacing rod 310. Each screwing device 210 is coupled to a slidable screwing device base 320. Both the slidable screwing device bases 320 and the slidable rail car bases 300 are slidable with respect to the spacing rods 310. Moving slidable screwing device bases 320, the slidable rail car base 300, or both the slidable screwing device bases 320 and the slidable rail car bases 300, allows for width adjustments of the placement of the screws by laterally moving the screwing device 210 and corresponding screw guide tubes 220. The slidable screwing device bases 320 and the slidable rail car bases 300 can have bore holes 330 for accepting a tension fit screw, such as a thumb screw 340, for fixing a respective slidable screwing device bases 320 and the slidable rail car bases 300 to the respective spacing rod 310.

The drive handles 240 can be coupled to a slidable rail car base 300 such that moving the drive handle 240 up and down results in the rail car 270 moving up and down the rail 260. Additionally, the drive handles 240 can be independently operated such a single screwing device 210 can be used.

Further, a biased return device 290 can be coupled to a slidable car base 300 at top end and coupled to the frame of cart 110 at the other end. The biased return device 290 can extend down from the drive handle 240 towards the work surface. In one example, the biased return device 290 can be a single gas charged strut. Movement of the drive handle 240 towards the work surface causes the single gas charged strut to move down and compress. The single gas charged strut provides a sufficient force to move the slidable car base 300 and the screwing device coupled thereto back up to a non-engaged position.

In one embodiment, a first sensor 350, such as a limit switch, can be provided coupled on the rail 260 and a second sensor 355, such as a second limit switch, can be provided coupled on rail 260. The first sensor 350 and second sensor 355 can be movable to adjust the distance between the sensors. In operation and when the screwing devices are in the rest or non-engaged position as shown in FIG. 1, the first sensor 350 or first limit switch is engaged against the rail car 270, and in such a position, the screwing devices 210 will not operate or is otherwise off. When the drive handle 240 is pushed down, the rail car 270 disengages from the first sensor 350 or first limit switch and the screwing device 210 is turned on or otherwise begins screw operations. When the screwing devices 210 and rail car 270 move vertically downward as a screw is inserted, the rail car 270 eventually contacts the second sensor 355 or second limit switch. When the rail car 270 contacts the second sensor 355 or second limit switch, the screwing devices 210 cease operating or are otherwise turned off, which in turn sets a predetermined screw insertion depth. The screwing devices 210 remain off or otherwise in a non-operative state until the first sensor 350 or first limit switch is engaged or depressed. When the first sensor 350 or first limit switch is engaged or depressed is no longer depressed or engaged, the screwing device will again begin screwing operations or otherwise be operable. As such, the screwing devices are turned on and off based on the position of the screwing devices. Alternatively, the screwing devices are at least turn off based on the insertion depth of a screw. The insertion depth of the screws can be altered by adjusting the height of at least the second sensor 355 or limit switch. Thus, the insertion depth of the screws can be predetermined and uniformly applied by any operator.

In another embodiment, a distance sensor 360 can be provided. The distance sensor 360 can project a visual or auditory cue downward to identify the distance from the last inserted screw. In operation, the operator can move the cart 110 forward until a predetermined distance is reached for inserting the next screws. In one arrangement, the sensor 360 can project a laser at a backward angle such that when the laser is on the previously inserted screws, the predetermined distance has been reached to insert the next screws.

In operation and started from a non-engaged position where the screwing devices 210 are up, a user can insert a screw down each screw feeding tube 230. Gravity will care the screw down the screw feeding tube 203 and the plurality of bristles 245 will center the insertion point of the screw against the work surface to insure that the screw is inserted roughly perpendicular to the work surface.

The operator can adjust the width of the screw insertion points by using tension fit screws to release and secure the slidable screwing device bases 320 and the slidable rail car bases 300 to the spacing rod 310. To laterally adjust the screw insertion point, the slidable screwing device bases 320 and/or the slidable rail car bases 300 can be slide along the spacing rod 310. Once a desirable distance between the two screw insertion points is reached, or a single screw insertion point is determined, the slidable screwing device bases 320 and the slidable rail car bases 300 can be fixed to the spacing rod 310. At the same time, the support brace 224, can be released and then fixed relative to the frame of the cart 110. With the width or lateral spacing components fixed, screw insertion can begin.

The screwing devices 210 can be operated to drive a screw downward through the screw guide tube 220 and into the work surface. The operator can apply manual force by moving the drive handles 240 downward to the work surface. The sensor 350 can determine when the screwing devices have descended to a point where the screw has been inserted to an appropriate insertion depth. Once the screw is at the predetermined insertion depth, the sensor 350 can stop the screwing devices 210 from operating.

During the movement of the screwing devices 210 downward, the biased return device 290 became compressed. Accordingly, the biased return device 290 provides a return force of the entire drive assembly along rail 260.

The operator can advance the cart 110 to the next insertion point and use the alignment tabs 112 as a visual guide to move along a straight line or otherwise position the cart 110 and screw guide tubes 220 at the next insertion point. As shown by line A-A in FIG. 4 and line B-B in FIG. 6, the axis of a portion of a drive handle 240 can be collinear with the longitudinal or central axis of the cart 110. Also, the axis of a portion of a drive handle 240 can also be collinear with the front wheel 125, which is at a midpoint between the two alignment tabs 112. As shown by line A-A in FIG. 4, the screw guide tubes 220 are offset from and spaced equally between the longitudinal or central axis of the cart 110. The structural arrangement allows for an operator to insert screws at desired distance on both sides of a center line. Alternatively, the lateral location of the slidable screwing device bases 320 and/or the slidable rail car bases 300 can be adjusted by the operator along the spacing rod 310 to align at least one screw guide tube 220 with the longitudinal or central axis of the cart 110.

Additionally, the distance sensor 360 can provide a visual or auditory indication of when the cart 110 has advance the appropriate distance. The user can move the cart 110 forward until the approach distance for the next screw insertion is reached as indicated by the distance sensor 360 projecting opposite from the direction of operation x and at an angle. In on embodiment, the cart 110 will be advanced the desired distance when the distance sensor 360 projects a beam that that will touch the immediately prior inserted screw. When the projected beach touches the prior inserted screw, the cart 110 and its components will be at the desired location to insert the next screw. The distance sensor 360 provides for uniform placement of the screws at predetermined distances from one another. When desired, the distances between successive screw placement can be changed by adjusting the angle at which the beam is projected.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. An apparatus, comprising:
   a cart with wheels;
   a screw assembly mounted to the cart, wherein the screw assembly comprises:
      a screwing device that rotates a drive shaft having a tip dimensioned to engage a screw;
      a screw guide tube that guides the drive shaft; and
      a screw feeding tube connected to the screw guide tube;
   a rail coupled to the cart and to which the screw assembly mounts, wherein the rail comprises spaced stops to maintain the screwing device at a particular height.

2. The apparatus of claim 1, wherein the screw guide tube comprises a port for viewing the drive shaft.

3. The apparatus of claim 1, wherein the screw guide tube comprises a plurality of screw centering bristles to align the screw with the drive shaft.

4. The apparatus of claim 1, wherein the cart further comprises an upright structure to which the screw assembly is movably mounted.

5. The apparatus of claim 1, wherein the cart further comprises support hooks.

6. The apparatus of claim 5, wherein the car further comprises bins coupled to the upright structure.

7. The apparatus of claim 1, wherein the screwing device comprises a plurality of screwing devices and wherein at least two screwing devices of the plurality of screwing devices have a counter drive shaft rotation.

8. The apparatus of claim 1, wherein the screw assembly further comprises a drive handle, wherein a central longitudinal axis of the drive handle is colinear with a central longitudinal axis of the cart.

9. The apparatus of claim 1, wherein the screw assembly further comprises a spacing rod mounting to which the screw guide tube is coupled and laterally adjustable.

10. An assembly, comprising:
    a bracket for coupling to a moveable platform;
    a screwing device coupled to the bracket and that rotates a drive shaft dimensioned to engage a screw;
    a screw guide tube that guides the drive shaft;
    a screw feed tube connected to the screw guide tube;
    a biased return device that provides a force to return the screwing device to a rest position;
    a rail coupled to the cart and to which the screw assembly mounts, wherein the rail comprises spaced stops to maintain the screwing device at a particular height.

11. The assembly of claim 10, wherein the screw guide tube comprises a port for viewing the drive shaft.

12. The assembly of claim 10, wherein the screw guide tube comprises a plurality of screw centering bristles to align the screw with the drive shaft.

13. The assembly of claim 10, further comprising a rail to which the bracket slidably mounts.

14. The assembly of claim 10, wherein the rail comprises spaced stops to maintain the screwing device at a particular height.

15. The assembly of claim 10, wherein the screw assembly further comprises a drive handle, wherein a central longitudinal axis of the drive handle is colinear with a central longitudinal axis of the moveable platform.

16. The assembly of claim 10, wherein the screw assembly further comprises a spacing rod mounting to which the screw guide tube is coupled and laterally adjustable.

* * * * *